(12) United States Patent
Balusamy et al.

(10) Patent No.: US 11,652,950 B1
(45) Date of Patent: May 16, 2023

(54) METHODS AND SYSTEMS FOR HANDLING DRIFTING OF COLORS IN PRINTING SCENARIOS

(71) Applicant: XEROX CORPORATION, Norwalk, CT (US)

(72) Inventors: Packiya Lakshmi Balusamy, Chennai (IN); Vignesh Doss, Palanichettipatti (IN); Rajasekar Kanagasabai, Chennai (IN); Sainarayanan Gopalakrishnan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/854,054

(22) Filed: Jun. 30, 2022

(51) Int. Cl.
*H04N 1/60* (2006.01)
*G06K 15/02* (2006.01)
*H04N 1/00* (2006.01)

(52) U.S. Cl.
CPC ......... *H04N 1/6027* (2013.01); *G06K 15/188* (2013.01); *G06K 15/1882* (2013.01); *H04N 1/0035* (2013.01); *H04N 1/6019* (2013.01); *H04N 1/6077* (2013.01)

(58) Field of Classification Search
CPC .. H04N 1/0035; H04N 1/6019; H04N 1/6027; H04N 1/6077; G06K 15/188; G06K 15/1882
See application file for complete search history.

(56) References Cited

U.S. PATENT DOCUMENTS

| | | | | |
|---|---|---|---|---|
| 5,121,195 A * | 6/1992 | Seki | ......................... | H04N 1/60 358/448 |
| 7,453,591 B2 * | 11/2008 | Yao | ...................... | H04N 1/6027 358/1.15 |
| 7,576,892 B2 * | 8/2009 | Ikeda | .................... | H04N 1/4076 358/1.9 |
| 7,612,915 B2 | 11/2009 | Zeng et al. | | |
| 7,724,406 B2 | 5/2010 | Wang et al. | | |
| 8,014,033 B2 * | 9/2011 | Wang | .................... | H04N 1/6033 358/1.9 |
| 8,155,439 B2 * | 4/2012 | Utsugi | .................. | H04N 1/6077 382/163 |
| 8,159,719 B2 * | 4/2012 | Bestmann | ............. | H04N 1/6077 358/1.9 |
| 8,310,723 B2 * | 11/2012 | Nakatani | ............ | H04N 1/40012 358/1.9 |

* cited by examiner

*Primary Examiner* — Scott A Rogers

(57) ABSTRACT

The disclosure discloses methods and systems for handling drifting of colors in printing. The method includes receiving a document including the image for printing, the image includes one or more gray and non-gray portions. An input from a user to selectively adjust the color of the gray portions of the image is received. The gray portions of the image are identified. Then, color values associated with the identified gray portions of the image are determined. Based on the user input, the determined color values associated with the gray portions of the image are selectively adjusted, without affecting non-gray color portions of the image to generate an updated image. The updated image is printed and the printed image includes adjusted color for the gray portions of the image such that gray color in the printed image is consistent with gray color of the image in the document.

20 Claims, 13 Drawing Sheets
(6 of 13 Drawing Sheet(s) Filed in Color)

| L* | A* | B* | | C | M | Y | K |
|---|---|---|---|---|---|---|---|
| 0 | 0 | 0 | | 210 | 255 | 0 | 0 |
| 0 | 128 | 128 | | 0 | 0 | 0 | 255 |
| 17 | 128 | 128 | | 0 | 0 | 0 | 255 |
| 34 | 128 | 128 | | 0 | 0 | 0 | 255 |
| 51 | 128 | 128 | | 103 | 121 | 84 | 119 |
| 68 | 128 | 128 | | 116 | 133 | 102 | 97 |
| 85 | 128 | 128 | | 124 | 138 | 113 | 74 |
| 102 | 128 | 128 | | 122 | 133 | 110 | 52 |
| 119 | 128 | 128 | | 114 | 122 | 101 | 30 |
| 136 | 128 | 128 | | 104 | 110 | 89 | 10 |
| 153 | 128 | 128 | | 92 | 98 | 79 | 0 |
| 170 | 128 | 128 | | 81 | 88 | 69 | 0 |
| 187 | 128 | 128 | | 70 | 78 | 59 | 0 |
| 204 | 128 | 128 | | 39 | 49 | 39 | 0 |
| 221 | 128 | 128 | | 28 | 38 | 28 | 0 |
| 238 | 128 | 128 | | 10 | 20 | 10 | 0 |
| 255 | 128 | 128 | | 0 | 0 | 0 | 0 |

FIG. 5B

METHODS AND SYSTEMS FOR HANDLING DRIFTING OF COLORS IN PRINTING SCENARIOS

TECHNICAL FIELD

The present disclosure relates to printing. More specifically, the disclosure relates to systems and methods for handling drifting of colors in printing scenarios.

BACKGROUND

Color printers have become quite popular and essential in our day-to-day life. We use printers for printing different contents such as text, images, graphs, or the like on printing media, which are mostly papers. In color printers, drifting of colors is quite common, i.e., the reproduced color or the color printed on the output images does not match with the intended color or does not match with the color of the input image submitted for printing. The problem of drifting of colors may occur due to various factors, such as aging of the color, temperature of the printer or external temperature, humidity, course of device operation, i.e., how long the printer is operating continuously such as for a day or a week, etc. For example, if a user is running the printer throughout the day or week it can also cause the drifting. There are chances that instead of printing 40% yellow, 30% yellow is printed due to drifting. Moreover, the impact of drifting of colors is more noticeable in the gray portions of the printed image as compared to non-gray portions, for example, blue portion, reddish-blue portion, etc., of the printed image.

To handle such drifting of color scenarios, the printers include a color balance feature. The feature allows the user to make color adjustments in any primary colors to mitigate the effect of the drifting of colors. For example, if the concentration or proportion of the Magenta (M) color is reduced due to the drifting of the color, then the user can simply select the color balance feature and increase the value of the Magenta (M) color. This way, the user can handle the drifting of colors problem. But according to the existing features, if the user uses the color balance feature and makes color adjustments to overcome the drifting problem, then the entire image gets affected. For example, the existing solutions change the gray portion as well as the non-gray portions of the image, which is not required. As one example, when adjusting Cyan color using the color balance feature, the combination of cyan colors present in the whole image gets impacted instead of the desired portion.

In this light, there is a need for improved methods and systems for managing the drifting of colors situation while printing an image/document.

SUMMARY

According to aspects illustrated herein, a method for handling drifting of colors in printing is disclosed. The method includes receiving an input document including an image for printing, wherein the image includes one or more gray portions and non-gray portions. The one or more gray portions are to be printed using composite gray colors. Once the document is received, an input from a user to selectively adjust color of the one or more gray portions of the image is received. The one or more gray portions of the image are identified. Then, color values associated with the one or more identified gray portions of the image are determined. Based on the user input, the determined color values associated with the one or more gray portions of the image are selectively adjusted, without affecting non-gray color portions of the image to generate an updated image. The updated image is printed, wherein the printed image includes adjusted color values for the one or more gray portions of the image such that gray color in the printed image is consistent with gray color of the image in the input document.

According to further aspects illustrated herein, a multi-function device for handling drifting of colors situations in printing is disclosed. The multi-function device includes a user interface for allowing a user to provide an input to adjust color of one or more gray portions in an image submitted for printing. The multi-function device further includes a controller having one or more modules for: receiving the image for printing, wherein the image includes the one or more gray portions and non-gray portions, and the one or more gray portions are to be printed using composite gray colors; identifying the one or more gray portions in the image; determining color values associated with the one or more gray portions of the image; and based on the user input, selectively adjusting the determined color values associated with the one or more gray portions of the image, without affecting non-gray portions of the image, thereby generating an updated image. The multi-function device additionally includes a print engine to print the updated image including the adjusted color values for the one or more gray portions of the image such that gray color in the printed image is consistent with gray color of the image submitted for printing.

According to further aspects illustrated herein, a printing device for handling drifting of colors in printing is disclosed. The printing device receives an image for printing, wherein the image includes one or more gray portions and one or more non-gray portions. The one or more gray portions are to be printed using composite gray colors. The printing device further receives an input from a user to adjust color of the one or more gray portions of the image and identifies the one or more gray portions of the image. Further, the printing device determines color values associated with the one or more identified gray portions of the image. Based on the user input, the printing device then selectively adjusts the determined color values associated with the one or more gray portions of the image, without affecting non-gray color portions of the image, thereby generating an updated image. Finally, the printing device prints the updated image including the adjusted color values for the one or more gray portions of the image such that gray color in the printed image is consistent with gray color of the image submitted for printing.

Other and further aspects and features of the disclosure will be evident from reading the following detailed description of the embodiments, which are intended to illustrate, not limit, the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 5A and 5B show exemplary tables including multiple color values in L*a*b color space format and CMYK color space format, respectively.

DESCRIPTION

Figure 1:
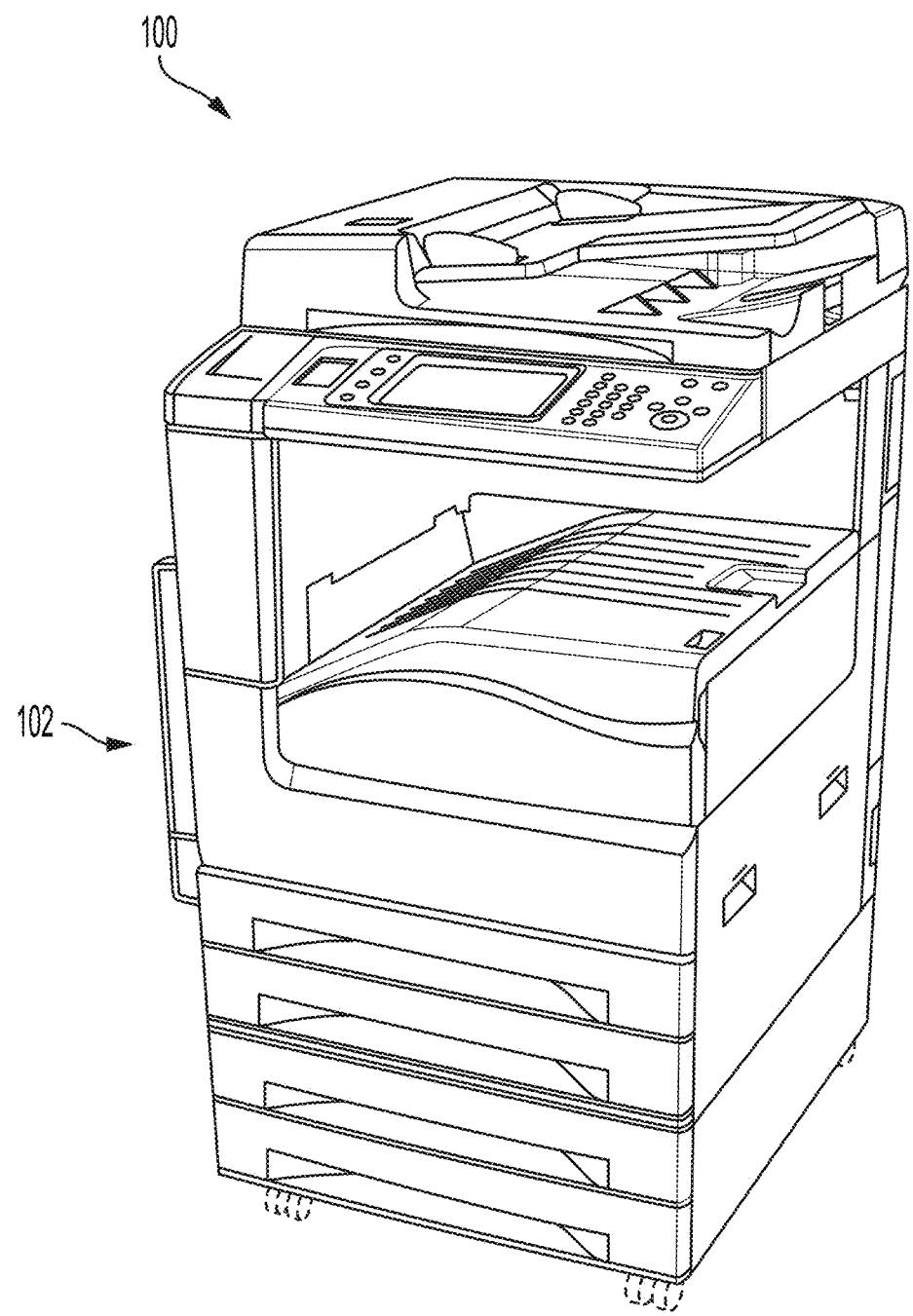
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or may be a combination of multiple devices, to perform one or more functions such as, but not limited to, printing, imaging, scanning, copying, or the like. The multi-function device may include software, hardware, firmware, or a combination thereof. In the context of the current disclosure, the multi-function device handles/manages drifting of colors while printing an input document including an image or an image. The image includes gray portions and/or other non-gray portions. Specifically, the multi-function device manages drifting of colors problem for gray portions (i.e., portions to be printed using composite gray colors) of the image submitted for printing. The multi-function device selectively adjusts the color of gray portions in the image such that gray color in the printed image is consistent/matches with gray color of the image in the input document.

The term "color space" refers to a color model that is used to represent the colors of an image or color value of each pixel forming an image. Some examples of the color spaces are Red-Green-Blue (RGB), Cyan-Magenta-Yellow (CMYK), or CIELAB color space. The CIELAB color space can also be referred to as L*a*b (L* represents perceptual lightness, and a* and b* represent four unique colors of human vision which are red, green, blue, and yellow).

The term "input document" refers to a document including one or more images submitted for printing. Alternatively, a user can directly submit an image for printing at the multi-function device. The user can submit the input document for printing either using his computing device or other ways for submitting the input document for printing. The input document is in the digital form. Alternatively, in case the user does not have the input document in the digital form, the user can first scan a document and convert it into the digital form for printing.

The term "gray portions" refers to the portions in the image that have a gray color or have shades of gray colors. In the context of the disclosure, the gray portions refer to the portions in the image that are to be printed using composite gray colors. The term "non-gray portions" refers to those portions in the image having colors other than gray color in the images such as Red, Green, Purple, Orange, Blue, Pink, or the like.

The term "composite color" refers to any color created or reproduced by combining two or more primary colors using a pre-defined color space format referred to as CMYK, namely Cyan (C), Magenta (M), Yellow (Y), Black (K) in different proportions. Cyan (C), Magenta (M), Yellow (Y), and Black (K) are the primary colors of the color space CMYK. For example, Cyan and Magenta can be combined to produce a purple color. In another example, Cyan, Magenta, and Yellow are combined in different proportions to reproduce the blue color. Few exemplary colors can be Red, Purple, or Green. The reproduced colors are used for printing.

The term "composite gray color" refers to a gray color reproduced by combining two or more primary colors of the CMYK color space format.

The term "drifting of color" in the context of imaging refers to change in the shade of the colors. Here, drifting of colors may occur due to different factors such as aging of the ink or toner, temperature of a printing device or external temperature, humidity, course of device operation, i.e., the duration for which the device has been operating continuously, etc. Further, the impact of drifting is relatively more noticeable in gray color portions, specifically when printed using composite gray color. Even a slight drift in a primary color, say cyan, may result in significant color change in the gray portion, but the effect of drifting of colors may not be significantly noticeable in the non-gray portion.

The term "adjusting" refers to changing color values associated with the one or more gray portions of the image.

The term "user" refers to any user who submits the image for printing and further wishes to adjust color for the gray portions in the image. The user further provides input related to adjusting the gray portions of the image. The user here may be aware about color values to be adjusted such that the gray color in the printed image is consistent/matches with gray color of the image in the input document.

The term "computing device" refers to a device that the user typically uses for his day-to-day work such as email, work, chatting, surfing, and other purposes. Examples of the computing device include, but are not limited to, a personal computer, a desktop, a laptop, a mobile device/phone, a tablet, a Personal Digital Assistant (PDA), or a smartphone. The computing device includes one or more applications. In the context of the current disclosure, the computing device refers to a device used by the user for submitting the image for printing.

Overview

The present disclosure discloses methods and systems for handling/managing drifting of colors in imaging scenarios such as printing, or copying. Specifically, the methods and systems handle/manage the drifting of colors in gray portions, i.e., the portions to be printed using composite gray colors, of an image submitted for printing. The methods and systems receive an input from a user to selectively adjust the gray portions. The user input includes adjustments to be made in color values of the gray portions. Based on the user input, the methods and systems make color adjustments such that the adjustments are made only in the gray portions of the image and the non-gray portions remain unchanged. In other words, the methods and systems make color adjustments such that color/color values are adjusted only for the gray portions of the image without changing colors/color values in other portions such as non-gray portions of the image. This way, the methods and systems manage the drifting of colors such that gray color in the submitted image is consistent with the gray color in the printed image.

In the color printers, different colors are reproduced by combining inks or toners of two or more primary colors, namely cyan (C), magenta (M), yellow (Y), black (K) in different proportions. The colors reproduced this way are referred to as composite colors. And just like any other color, the gray color is reproduced by mixing two or more primary colors in different proportions and the gray color reproduced using this process is referred to as composite gray color. Alternatively, the gray color can be reproduced using only black color component (K) instead of using two or more primary colors and such gray color can be referred to as regular gray color or non-composite gray color. Most color printers use two or more primary colors i.e., composite gray color approach for printing gray portions in any image/document received for printing because the richness of the composite gray color is better than that of the non-composite gray color.

When an image is submitted for printing, firstly, a color space conversion is performed on the received image. Typically, in image processing, Red-Green-Blue (RGB) color space is used for display purposes, but, for printing Cyan-Magenta-Yellow (CMYK) color space is used. Thus, the received image is required to be converted from the RGB color space to the CMYK color space. Further, the RGB color space format is device-dependent, for example, RGB values for a particular image on a desktop are different than RGB values for the same image on another device such as a phone. Thus, the received image is first converted to a device-independent color space format. One such popular device-independent color space format is CIELAB color space, also referred, as L*a*b. Therefore, the received image is first converted from the RGB color space to the L*a*b color space, then from the L*a*b color space to the CMYK color space. Once converted, the CMYK color values are used for printing the image.

Exemplary Environment

FIG. 1 shows an exemplary environment 100 in which various embodiments of the disclosure can be practiced. The environment 100 includes a multi-function device 102. Various examples of the multi-function device 102 may be a printer, a scanner, a copier, a multi-function peripheral device, or the like. The multi-function device 102 provides one or more functionalities such as printing, scanning, imaging, copying, and so on. In context of the present disclosure, the multi-function device 102 handles/manages drifting of colors in printed images. Specifically, the multi-function device 102 manages drifting of colors for gray portions, i.e., the portions to be printed using composite gray colors in images.

In context of the current disclosure, the multi-function device 102 includes a new option such as a composite color option that allows the user to adjust only the composite gray region. The option can be enabled when the user wishes to adjust color for the gray portions of an image. Once the option is enabled, any adjustment, i.e., change in color values for any of the primary colors only changes the color of composite gray regions/portions, i.e., the portions printed using composite gray colors. For example, when adjusting Cyan color using the option, the combination of Cyan color present in the gray portions of the image is adjusted instead of the whole image as in the existing solutions.

Figures 2A, 2B:
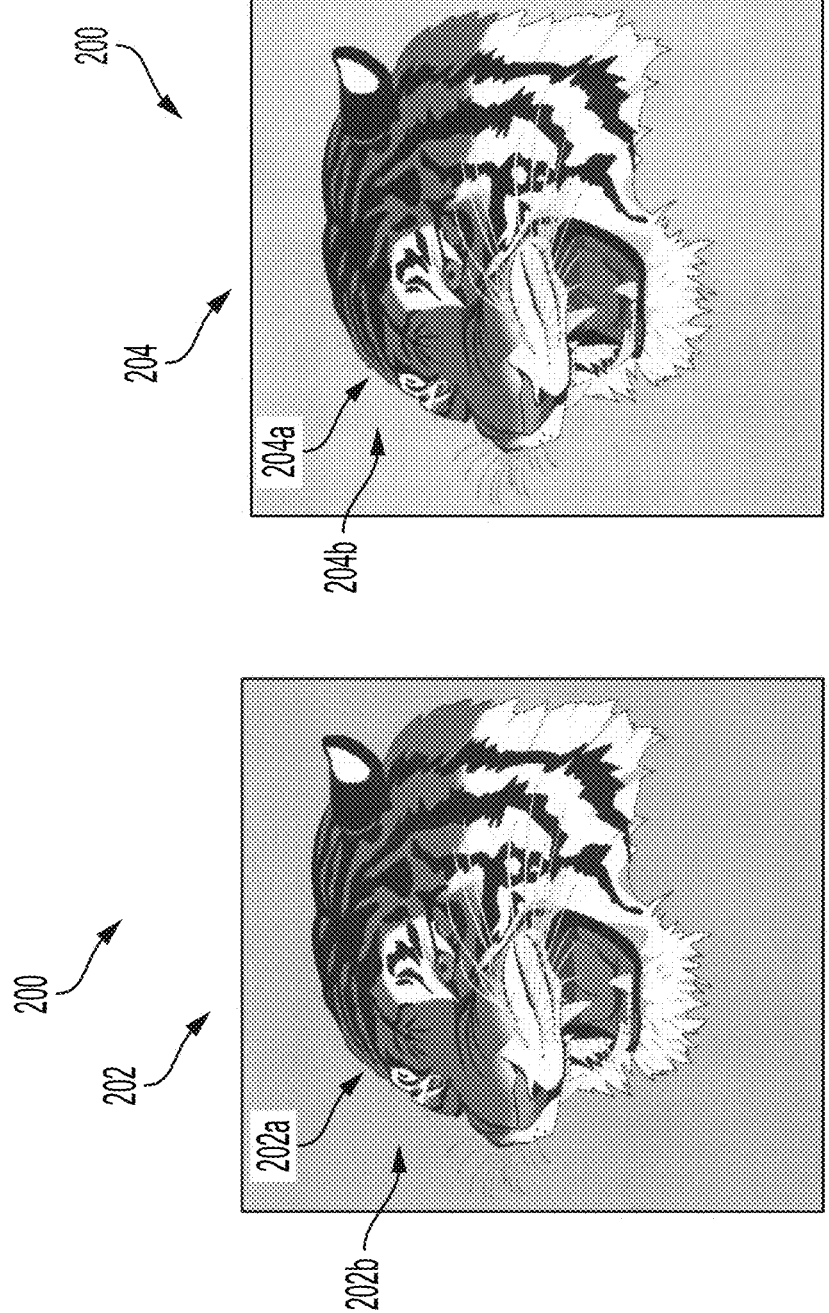
FIGS. 2A and 2B show exemplary snapshots illustrating the impact due to drifting of colors in a printed output.

Drifting of colors in gray portions is a problem when composite gray tends to be not gray or a different color in an output image such as the printed image. Drifting of colors is quite common that occurs due to various factors, such as aging of the color, temperature of the printing device or external temperature, humidity, or course of device operation. It is further observed that the impact of drifting of color is more noticeable or evident in the gray color portions of the image as compared to non-gray portions of the image. One exemplary snapshot 200 to demonstrate the impact of drifting of colors is shown in FIG. 2B. A snapshot 200 of FIG. 2A shows an input image 202 of a tiger. The input image 202 is submitted for printing. An output image 204 generated after printing is shown in FIG. 2B. The output image 204 is printed according to known solutions and includes drifted colors in the output image 204. In the input image 202, a face portion of the tiger is labeled as 202a and a background portion is labeled as 202b, which is referred to as a gray portion. In the output image 204, a face portion of the tiger is labeled as 204a, and a background portion is labeled as 204b. Upon comparing the input image 202 in FIG. 2A with the output image 204 in FIG. 2B, the impact of drifting of colors is evident in the background portion 204b as compared to the face portion 204a of the output image 204. For example, the composite gray color in the background portion 204b is not gray or is a different color in the printed image 204. Thus, it is observed that the effect of drifting of colors is more evident in the gray portions, i.e., the portions printed using composite gray colors, as compared to the non-gray portions of the image. To overcome this problem, the present disclosure is presented.

In implementation, a user submits a document for printing including an image having one or more gray portions and/or non-gray portions. The gray portion is printed using composite gray colors, i.e., using two or more primary colors of CMYK color space format.

The multi-function device 102 receives the image for printing. The multi-function device 102 further receives input related to adjustments to be made in the gray portions (i.e., the portions to be printed using composite gray colors) and initiates processing. Thereafter, the multi-function device 102 identifies one or more gray portions in the received image, and once identified, the multi-function device 102 selectively adjusts the colors (or color values) of the one or more gray portions based on the received input. Here, the multi-function device 102 adjusts color values of the gray portions, without affecting non-gray color portions of the image, thereby generating an updated image. Once adjusted, the multi-function device 102 prints the updated image. The updated image includes adjusted color (color values) of the one or more gray portions of the image such that gray color in the printed image is consistent with gray color of the image in the input document. The colors of the gray portions are adjusted such that gray color in the printed image is consistent with the input image.

For example, for an image submitted for printing, if the user input indicates that in the gray portion of the image, the value of Cyan color is required to be increased by a value 10, then the multi-function device 102 prints the image such that the value of Cyan is changed only in the gray portions of the image and the value of Cyan remains unchanged in the non-gray portions of the printed image. Further continuing with the example, if the value of CMYK corresponding to a gray portion in the received image is 104, 100, 89, 10, then the value of CMYK corresponding to the gray portion in the output image after adjustment is 114, 100, 89, 10 with a change in the primary color Cyan as indicated by the user. For non-gray portions, if the value of CMYK corresponding to a non-gray portion in the received image is 130, 175, 156, 104, then the value of CMYK of the non-gray portion in the printed image remains the same as in the input image, i.e., 130, 175, 156, 104.

Exemplary System

Figure 3:
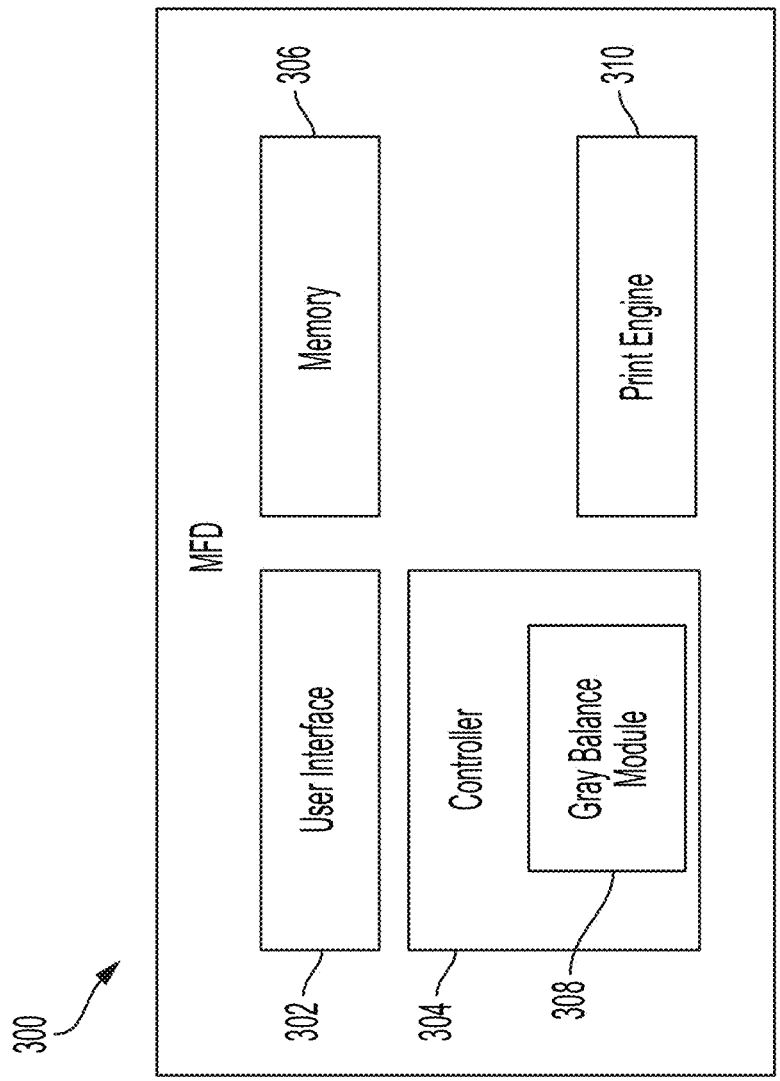
FIG. 3 is a block diagram illustrating various components of a multi-function device, in accordance with an embodiment of the present disclosure.

FIG. 3 is a block diagram illustrating various components of a multi-function device 300 for implementing the current disclosure. As shown, the multi-function device 300 includes a user interface 302, a controller 304, a memory 306, and a print engine 310. The controller 304 further includes a gray balance module 308. The components 302-310 are connected to each other via a conventional bus or a later developed protocol. And the components 302-310 communicate with each other for performing various functions of the present disclosure. The multi-function device 300 may further include additional component(s) as required to implement the present disclosure.

The implementation begins when a user wishes to change color of gray portions of an image submitted for printing to handle color drifting situations. Initially, a user submits an image for printing including gray portions and non-gray portions. In one example, the user may submit the image for printing using his computing device. In case the user does not have the digital image, then the user may first scan the physical image and convert it into the digital image. For example, the user may place the physical image either on a platen or a document feeder of the multi-function device 300. This way, the digital image is obtained at the multi-function device 300.

The user then accesses the multi-function device 300, specifically the user interface 302. Once accessed, the user interface 302 displays various options such as scan, print, scan to cloud, or the like, to the user. Thereafter, the user selects the print option to proceed forward. Once selected, the user interface 302 presents various options to the user to configure print properties. Exemplary options include print type to specify a type of print, i.e., colored, or black and white print, tray option to select a tray and print media stored in the tray, color balance option to balance or adjust proportion or concentration of different primary colors, i.e., Cyan (C), Magenta (M), Yellow (Y), Black (B). In the context of the disclosure, the user selects the color balance option.

Figure 4A:
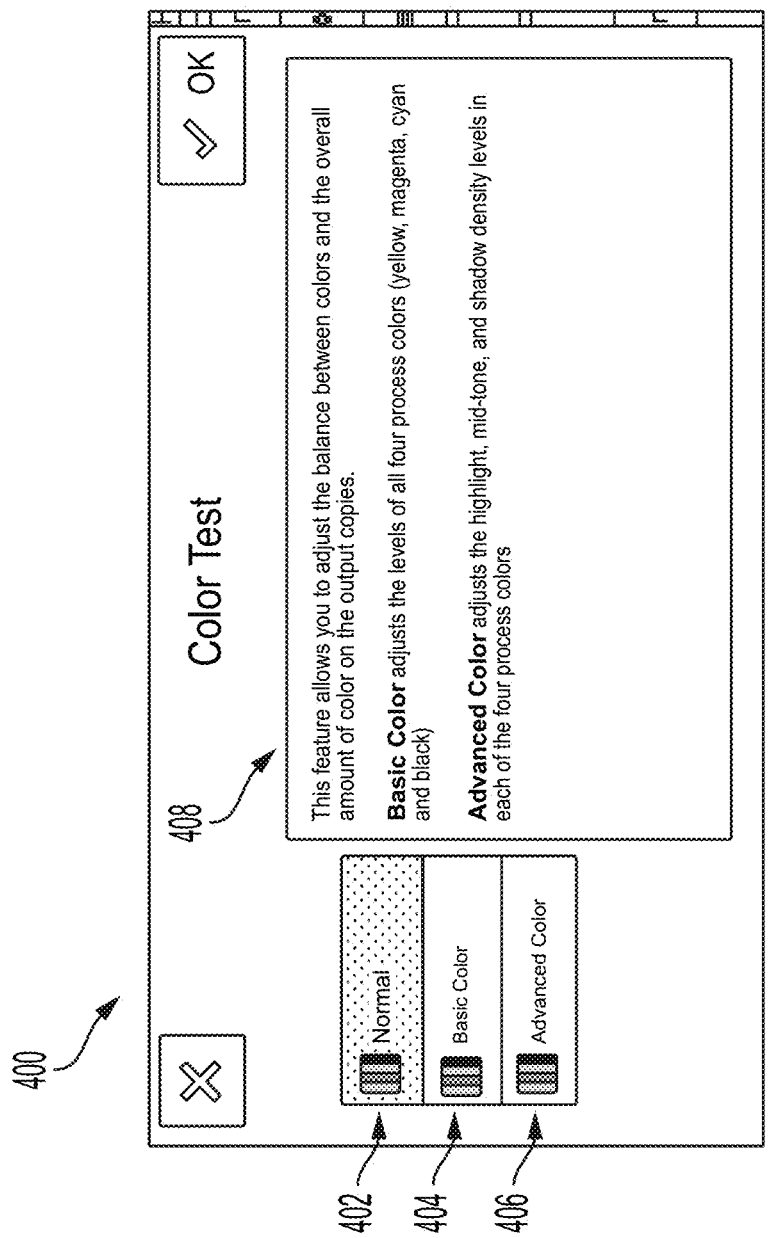
FIGS. 4A-4D are exemplary snapshots of user interfaces of a multi-function device, in accordance with an embodiment of the present disclosure.
Figure 4B:
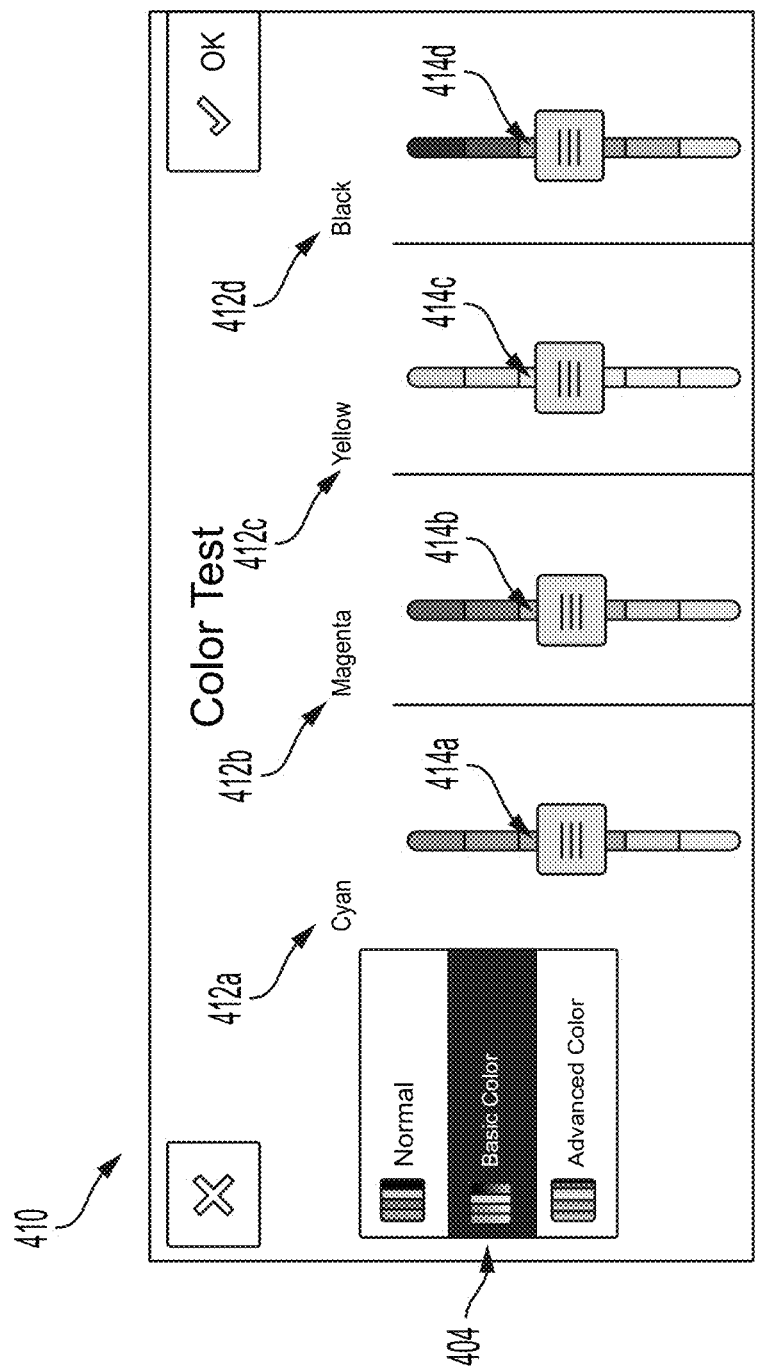
Figure 4C:
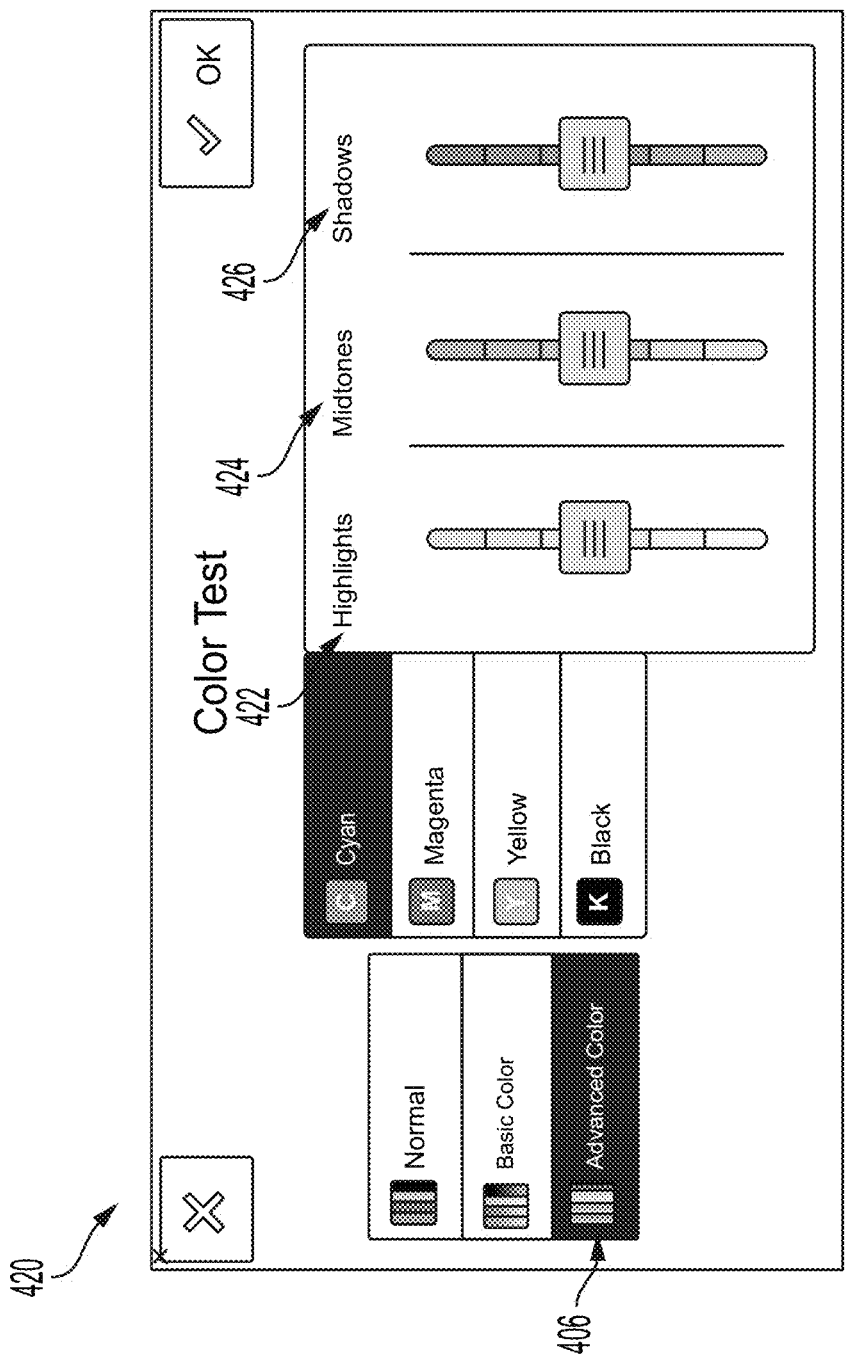

Upon selection of the color balance option, the user interface 302 displays further options to the user. The option allows the user to adjust the proportion or concentration of different primary colors. Some exemplary snapshots of the user interfaces are shown in FIGS. 4A-4D. FIG. 4A illustrates one exemplary user interface 400 presented to the user upon selection of the color balance option. The user interface 400 includes different color balance options, such as normal labeled as 402, basic color labeled as 404, and advanced color labeled as 406. The user may select any desired color balance option and make desired color adjustments. As shown, the user selects the normal option 402 and once selected, the user interface 400 displays a message 408 to assist the user in understanding different color balance options. The user may select any of the options 402, 404 and 406. FIG. 4B illustrates another user interface 410 presented to the user when the user selects the basic color balance option 404. The option 404 allows the user to adjust the levels of different primary colors, namely Cyan (labeled as 412a), Magenta (labeled as 412b), Yellow (labeled as 412c), and Black (labeled as 412d). As shown, for each primary color 412a, 412b, 412c, 412d (collectively 412), a corresponding adjustment button 414a, 414b, 414c, 414d (collectively 414), respectively, is provided. The adjustment button 414 can be in the form of a slider button. The adjustment button 414 allows the user to make desired adjustments. As illustrated, for each primary color, seven possible adjustments are available and the user may move the corresponding slider button, say 414a, between +3 to −3 to make a desired adjustment. Similarly, another user interface 420 which is displayed when the user selects the advanced color balance option 406 is shown in FIG. 4C. The option 406 offers additional options that allow the user to make adjustments in the colors. Here, the advanced color option 406 allows the user to select individual primary colors and for each primary color such as Cyan, the user has options to adjust the color in different ranges, namely 'Highlights' labeled as 422, 'Midtones' labeled as 424, and 'Shadows' labeled as 426.

Figure 4D:
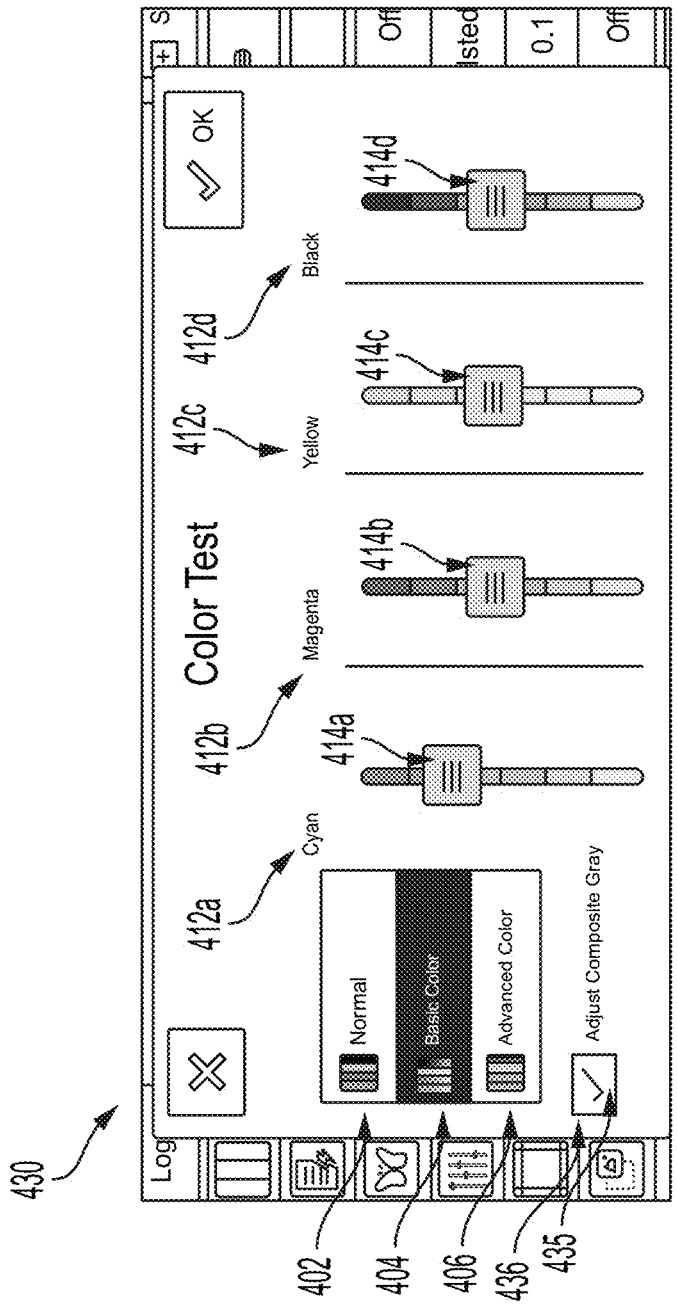

In context of the current disclosure, the user interface 302 includes a new option, such as "Adjust Composite Gray". The "Adjust Composite Gray" option allows the user to selectively adjust composite grays. For example, the selection of the option makes adjustments only in the composite gray portions of the image and the non-gray portions remain unaffected by the changes. One such exemplary user interface 430 is shown in FIG. 4D. As illustrated, the user interface 430 displays various color balance options such as 402, 404 and 406. As discussed above, the user can select any of the options 402, 404 and 406 to adjust the different colors using corresponding color scales, marked as 414a, 414b, 414c, and 414d. As shown, the user interface 430 includes the new option "Adjust Composite Gray" labeled as 436. The user can select the option 436 using a checkbox such as 435 or other possible ways. For example, when the user selects the option 436, any adjustments or corrections made in any primary color 412a, 412b, 412c, or 412d are only reflected in the gray portion (i.e., the portions to be printed using composite gray colors) of the image, without affecting non-gray portions of the image. Here, the user provides the input by selecting the new option Adjust Composite Gray 436. The user further provides change in color values corresponding to one or more primary colors of CMYK (Cyan-Magenta-Yellow-Black/key) color space format. The color values can be changed using the adjustment button as discussed above. For example, if Cyan value is 200 and the user moves the adjustment button, for example, upward by one level, the color value may be changed to 210 or 220. If Cyan value is 200 and the user moves the adjustment button, for example, downward by one level, the color value may be changed to 190 or 180. After providing the input, the user initiates printing. The adjustment button can be set to make the required changes in color values as required by the user and/or by an organization.

Thereafter, the controller 304 initiates the processing and prints the document with adjusted composite gray portions according to the user input. In detail, the controller 304 obtains RGB (Red, Green and Blue) value for each pixel of the received image.

Once obtained, the controller 304 performs color space conversion of the received image. The controller 304 converts the received image from the RGB color space to the L*a*b color space, i.e., the controller 304 converts the color values of each pixel from RGB color space format to L*a*b color space format. In one example, the controller 304 performs the conversion using a look-up table which provides L*a*b values corresponding to each combination of Red, Green, and Blue color values.

Thereafter, the controller 304 obtains CMYK (CYAN, MAGENTA, YELLOW and BLACK) color values corresponding to each combination of L*a*b color values. To obtain the CMYK color values, the controller 304 converts the color values for each pixel from L*a*b color space to CMYK color space. The controller 304 may use known algorithms or later developed algorithms, to convert the L*a*b color values to the CMYK color values. In one example, the controller 304 performs the L*a*b to CMYK color space conversion using a color table that operates on node-based trilinear interpolation. Once obtained, the controller 304 forwards the L*a*b color values and corresponding CMYK color values for each pixel of the image to the gray balance module 308 for further processing. Further, the controller 304 forwards the information related to the user input to adjust the gray portions.

Once obtained, the gray balance module 308 updates or adjusts the CMYK color values for portions (pixels) constituting the gray portions in the image based on the user input. To accomplish this, the gray balance module 308 first identifies all the pixels of the document that constitute the gray portions in the document. Thus, the gray balance module 308 obtains a pre-stored look-up table from the memory 306. The look-up table includes a list of all the probable L*a*b color values which may constitute the composite gray portion in any document, i.e., the look-up table includes a list of possible combinations of L*a*b color values that can form gray color or shades of gray.

Figure 4E:
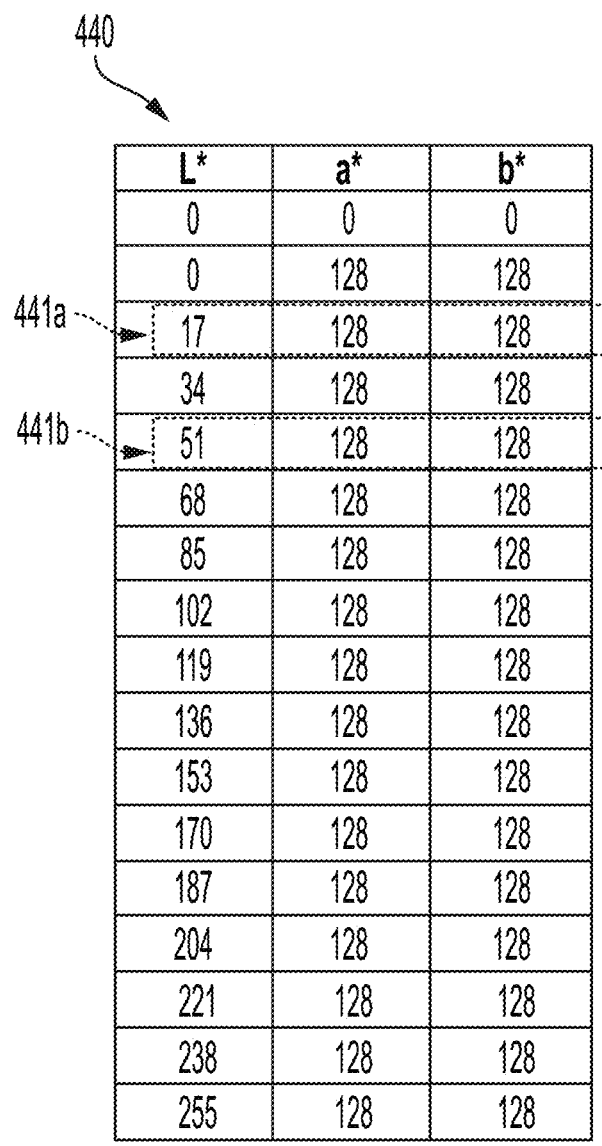
FIG. 4E illustrates an exemplary look-up table including color values in L*a*b color space format, in accordance with an embodiment of the present disclosure.

FIG. 4E illustrates an exemplary look-up table 440. As shown, the look-up table 440 includes a list of probable L*a*b color values for different gray color shades. For example, L*a*b color value marked as 441*a* forms the gray color. In another example, L*a*b color value (marked as 441*b*) forms the gray color and so on. The listed L*a*b color values represent possible combinations of gray colors. The memory 306 stores the look-up table 440.

Once obtained, the gray balance module 308 identifies the pixels forming the gray portions of the image. The gray balance module 308 compares the L*a*b values of the received image with the L*a*b values of the look-up table. The matching L*a*b color values represent the gray portions in the received image. Upon comparison, the gray balance module 308 identifies all the pixels in the received image forming the gray portions. In other words, the gray balance module 308 identifies all pixels having the gray color in the image. This way, the gray balance module 308 identifies the pixels of the image forming/constituting the gray portions.

The gray balance module 308 then identifies corresponding CMYK color values of the pixels forming the gray portions. For each pixel falling in the gray portions of the image, a CMYK color value is identified corresponding to L*a*b color value. Once identified, the gray balance module 308 adjusts corresponding CMYK values of the identified pixels based on the user input. In one example, if the L*a*b value for the identified pixel, i.e., the pixel constituting the composite gray portion is 51, 128, 128 and the corresponding CMYK color value is 103, 111, 84, 119, and the user input indicates to increase the value of magenta (M) by a value 10 to balance the composite gray portions of the image. Then, the gray balance module 308 adjusts the CMYK color value of the identified pixel to 103, 121, 84, 119, i.e., the value of magenta (M) is increased from 111 to 121. In another example, if the L*a*b color value for the identified pixel is 68, 128, 128 and the corresponding CMYK color value is 116, 123, 102, 97, further the user input indicates to increase the value of cyan (C) by a value 5 and magenta (M) by a value 10 to balance the composite gray portions of the image. Then, the gray balance module 308 adjusts the CMYK value of the identified pixel to 121, 133, 102, 97, where the value of Cyan is increased from 116 to 121 and the value of magenta (M) is increased from 123 to 133. The gray balance module 308 makes adjustments such that color values are adjusted only for gray portions of the image without affecting other portions of the image such as non-gray portions. In simple words, the gray balance module 308 adjusts the color values of pixels forming the gray portion of the image instead of all pixels of the image. This way, the gray balance module 308 adjusts gray portions of the image.

Here, for all the remaining pixels, the value of CMYK is kept the same, i.e., the CMYK values of the remaining pixels remain the same as received from the controller 304 after the L*a*b to CMYK color space conversion. In other words, for the pixels which are not part of the gray portion or for the pixels for which the L*a*b values do not match the L*a*b values of the pre-stored (reference) look-up table, the CMYK color values remain unchanged. This way, an updated image is obtained. The updated image includes adjusted color values of gray portions of the image, specifically, the updated image includes adjusted CMYK color values of all the pixels forming the gray portion of the image while CMYK color values for remaining pixels i.e., non-gray portions are as-is. Thereafter, the gray balance module 308 sends the updated image to the print engine 310 for printing.

Once received, the print engine 310 prints the updated image including adjusted color values for gray portions of the image. The print engine 310 prints the updated image, resulting in a printed image. Here the printed image includes the same gray portion as in the received image. This way the multi-function device 300 manages composite grays to compensate for the drifting of colors.

Continuing with FIG. 3 description, the memory 306 stores all relevant information required for implementing the current disclosure. For example, the memory 306 stores a look-up table including a list of L*a*b color values which may constitute composite gray portions in any image. The memory 306 stores look-up tables to assist the controller 304 to perform the color space conversions. Any details stored in the memory 306 may be retrieved by the gray balance module 308, controller 304 or other components for implementing the current disclosure. The user interface 302 can be used for displaying information to the user and/or can be used for providing inputs required for implementing the disclosure.

Exemplary Snapshots

Figure 5A:
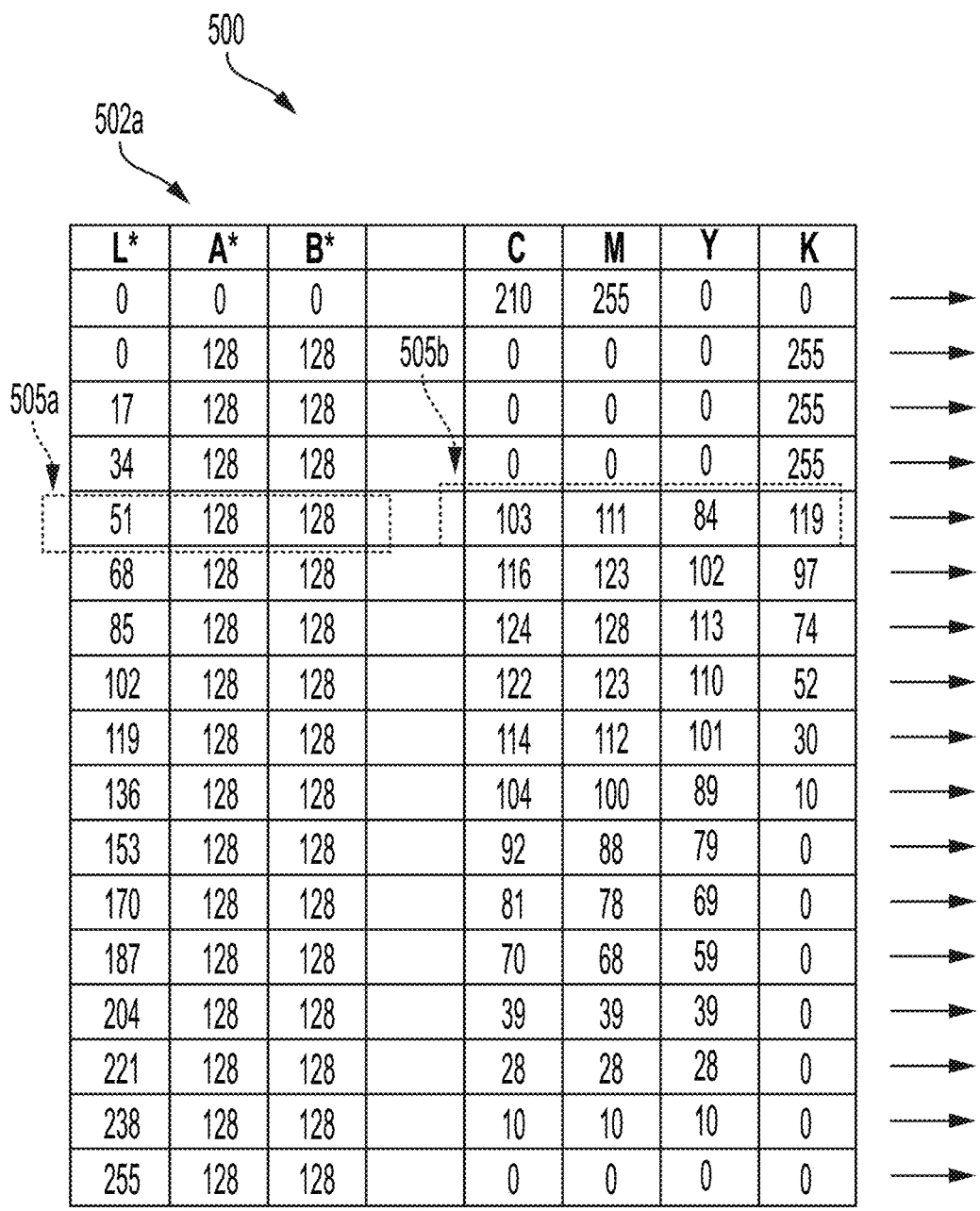

FIG. 5A illustrates an exemplary snapshot 500 of a table including color values of possible grays/gray portions in L*a*b color space format. As shown in the snapshot 500, the table 502a includes L*a*b color values forming possible gray portions. As illustrated, L*a*b color value, marked as 505a represents a gray color. Along with this, the table 502a includes corresponding CMYK color values for each L*a*b color value. For example, CMYK color value 505b corresponding to L*a*b color value 505a, is shown. Based on the input from the user, the color values of gray portions are adjusted. One such exemplary table such as 502b with adjusted CMYK color values corresponding to gray portions in the input image is shown in FIG. 5B. As clearly seen in FIG. 5B, the updated table 502b includes adjusted CMYK color values (marked as 503a) corresponding to different L*a*b values constituting the gray portion of the input image. Both the tables 502a and 502b include exemplary L*a*b values for composite gray portions.

As one example, it is considered if the user increases the value of magenta (M) by a value 10 to balance the gray portions of the received image, the value of magenta is increased by 10 corresponding to each L*a*b value. For example, for the L*a*b value 51, 128, 128 (marked as 505a), the corresponding CMYK value is 103, 111, 84, 119, marked as 505b. Based on the user input to increase the CMYK color value, specifically, Magenta (M) by 10, the corresponding CMYK color value is increased to 103, 121, 84, 119, where the value of magenta (M) is increased from 111 to 121, marked as 507b.

In some implementations, the value of Magenta (M) is not increased when the color value is either 255 or 0. For CMYK color value 255, the value is not increased, as the value of each color is represented by 8 bits and 255 is the maximum value, thus the value of Magenta (M) may not be increased beyond 255. Similarly, for CMYK color value 0, the value is not increased, as 0 indicates that magenta is not present at all, thus the color value is not adjusted.

Figures 5C, 5D:
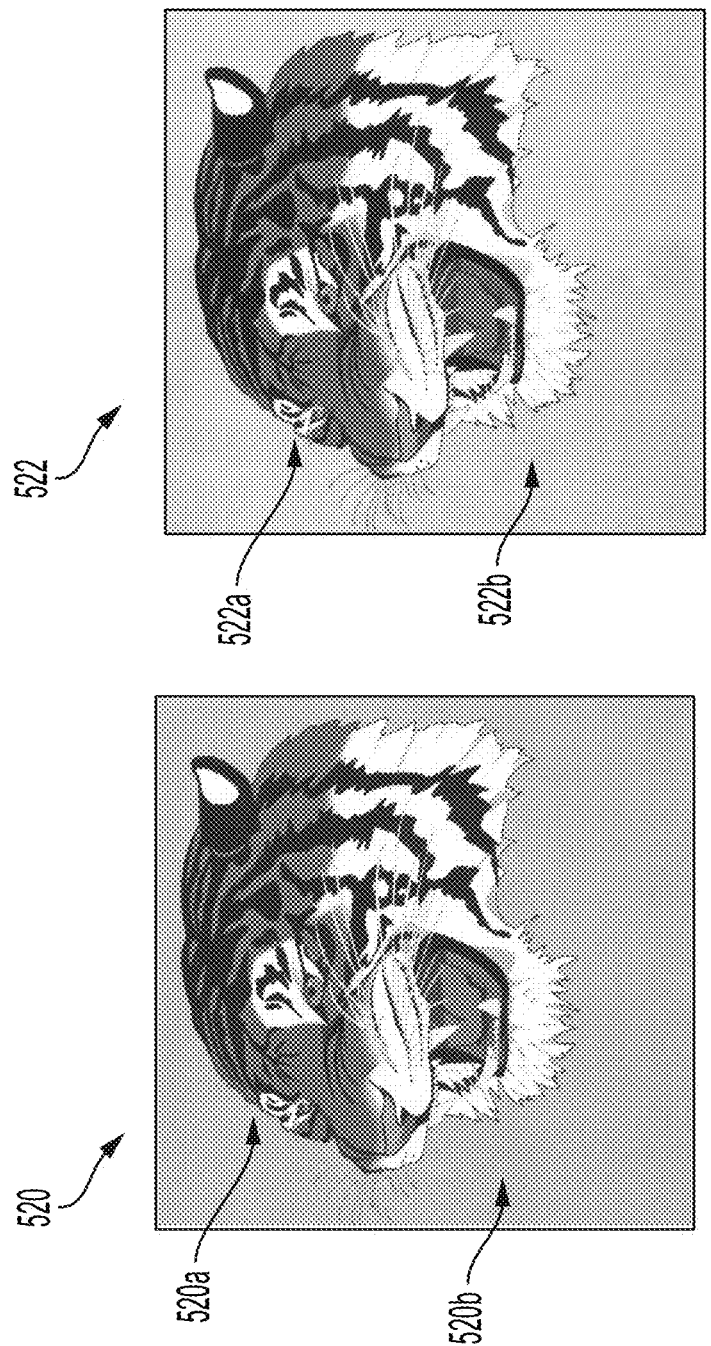
FIG. 5C shows an input image.
FIG. 5D shows an image illustrating the impact due to drifting of colors.

FIG. 5C shows an input image 520, where 520a represents a non-gray portion and 520b represents a gray portion of the image 520. FIG. 5D shows an image 522 illustrating the impact of drifting of colors, where the gray color in gray portion 522b is significantly different from the gray color in the gray portion 520b in the input image 520. Further, in the image 522, the color of non-gray portion 522a is not significantly affected, as the difference in non-gray portion 522a of the image 522 and the non-gray portion 520a of the image 520 is not significant.

Figures 5E, 5F:
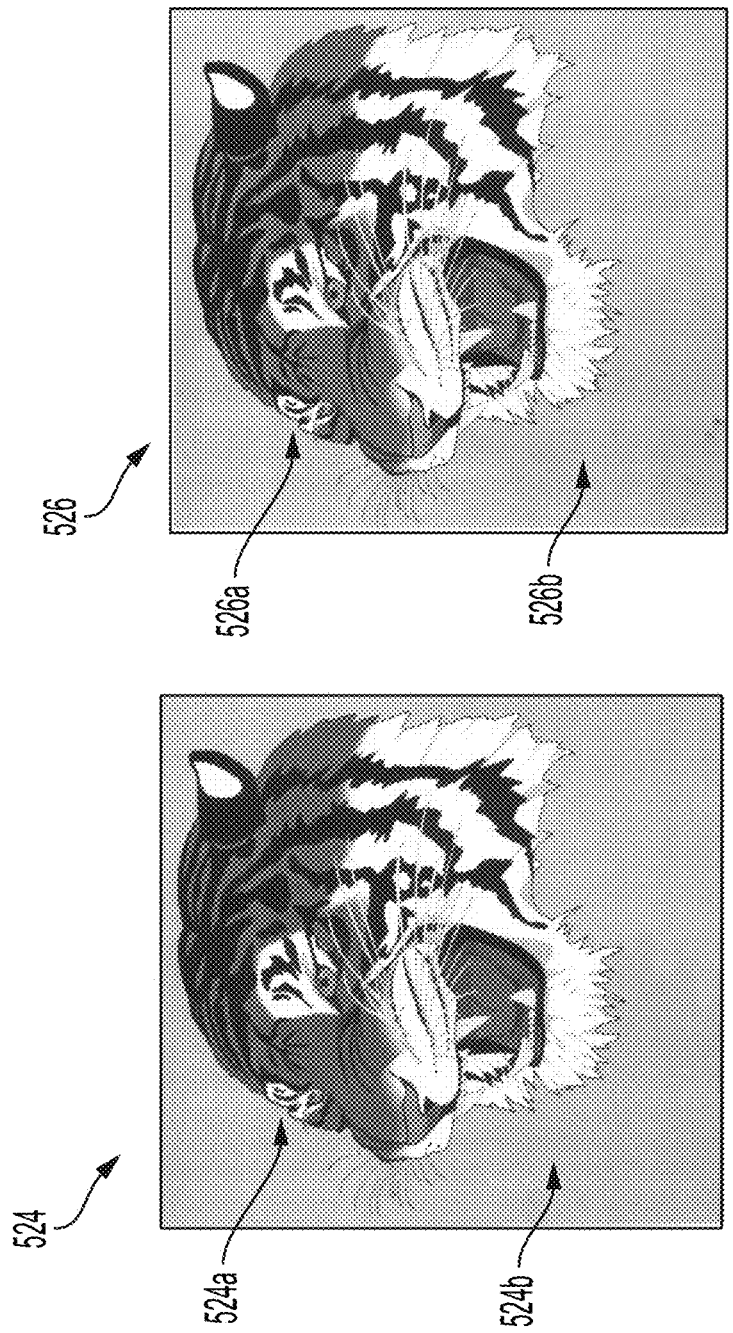
FIG. 5E shows an output image according to existing solutions and FIG. 5F shows an output image according to the implementation of the present disclosure.

According to the existing solutions, the output image is shown as 524 in FIG. 5E. In the output image 524, though the gray portion 524b of the output image 524 seems to match with the gray portion 520b of the input image, but, the color of non-gray portions 524a is significantly different from the non-gray portion 520a of the input image 520. As clearly seen in FIG. 5E, the non-gray portion 524a is also affected. Thus, there is a need for solutions that can adjust the color of gray portions 520b of the input image 520, without affecting non-gray portion 520a of the input image 520 and the present disclosure is proposed.

According to the implementation of the present disclosure, when the input image 520 is printed, the output image 526 is generated as shown in FIG. 5F. The printed image 526 includes the gray portion 526b and the non-gray portion 526a. As clearly shown in FIG. 5F, the gray color in gray portion 526b is consistent with the gray color in the gray portion 520b in the input image 520 such that non-gray portion 520a of the input image 520 is not affected/adjusted/changed. The present disclosure ensures that while adjusting the color of the gray portion 526b, the color of the non-gray portion 526a remains unaffected and the color is similar to the non-gray portion 520a of the input image 520.

Exemplary Flowchart

Figure 6:
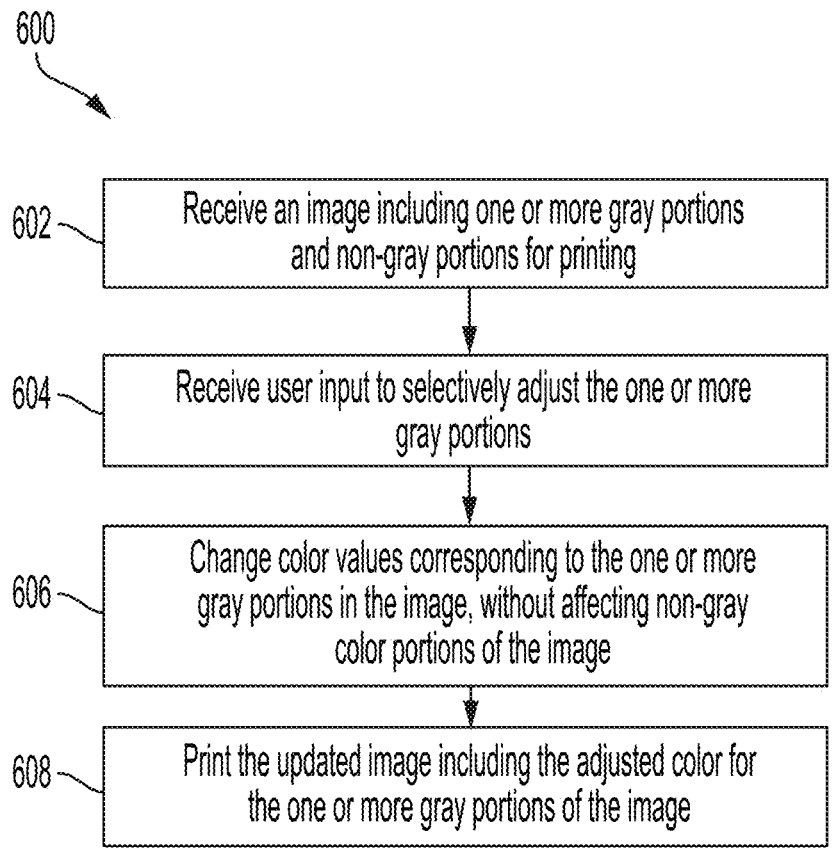
FIG. 6 is a method flowchart for handling drifting of colors in printing scenarios, in accordance with an embodiment of the present disclosure.

FIG. 6 is a method 600 for handling/managing the drifting of colors in printing scenarios. The method 600 may be implemented at a multi-function device, such as the multi-function device 102 of FIG. 1, or the multi-function device 300 of FIG. 3. But the method 600 may be implemented at any equivalent device with printing functionalities and/or color balancing functionality.

The method 600 begins when a user submits a document or an image for printing. Here, the user wishes to receive the printed image with a matching gray portion as in the image submitted for printing. The user may submit the image in digital form stored on his computing device or can be obtained via scanning a physical image printed on paper.

Once submitted, at 602, the image is received for printing. The image includes one or more gray portions and one or more non-gray portions. The gray portions are to be printed using composite gray colors. The user then accesses the multi-function device. Once accessed, various options such as scan, print, scan to cloud, or the like are displayed to the user. The user selects the print option to proceed forward.

Upon selection of the print option, additional options as discussed above are displayed to the user to configure print properties. Some exemplary options include print type, tray option, color balance option, and so on. In the context of the disclosure, the user selects the color balance option. The color balance option allows the user to adjust the proportion or concentration of different primary colors. Once the user selects the color balance option, a new option, say "Adjust Composite Gray", is displayed to the user. The new option allows the user to selectively adjust composite grays, i.e., adjustments made in the primary color are only reflected in the gray portions of the image while the non-gray portions remain unaffected by the adjustment. This way, the user provides input to selectively adjust the gray portions of the image.

Once provided, at 604, the user input to selectively adjust the one or more gray portions is received. The input from the user includes the selection of "Adjust Composite Gray" option. Upon selection of the option, the user further provides input by selecting primary color such as one or more of CMYK (Cyan-Magenta-Yellow-Black/key) color space format and further provides input regarding change in color values corresponding to one or more primary colors. The change in color values can be specified either via a slider option as shown in FIG. 4E or can be provided in a text box. These are few examples, but the user can provide the input using other ways. Thereafter, the user initiates printing.

Once initiated, the processing of the received image is initiated. In detail, RGB (red, green and blue) value for each pixel of the received image is obtained. Thereafter, color space conversions of the received image are performed. First, the color space of the received image is converted from RGB color space to the L*a*b color space, i.e., the color values of each pixel in RGB color space are converted to L*a*b color space. Based on the color values in L*a*b color space, gray portions of the image are obtained. Specifically, pixels forming the gray portions in the image are identified. The gray portions of the image are identified based on a pre-stored look-up table. The look-up table includes L*a*b color values for possible combinations of grays. The L*a*b color values of the received image are compared with L*a*b values of the look-up table to identify the gray portions of the image. Upon comparison, all the pixels for which L*a*b values of the received image match with L*a*b values of the look-up table are identified. This way, the gray portions in the received image are identified, specifically, pixels forming the gray portions in the received image are identified. Here, color values of pixels or gray portions of the received image are identified in the L*a*b color space.

Thereafter, CMYK (cyan, magenta, yellow and black) color values corresponding to the identified L*a*b color values are obtained. This way, color values of pixels or gray portions of the received image are identified in the CMYK color space. Further, CMYK color values corresponding to non-gray portions are also identified.

Thereafter, at 606, color values (CMYK color values) for portions constituting the gray portions in the image are adjusted based on the user input. Once the pixels constituting the gray portion are identified and corresponding CMYK color values are determined/identified, CMYK color values of the identified pixels are adjusted based on the user input. In one example, if the L*a*b value for the identified pixel, i.e., the pixel constituting the composite gray portion is 136, 128, 128 and the corresponding CMYK value is 104, 100, 89, 10, and the user input includes increasing the value of cyan (C) by a value 20. Then, the CMYK value of the identified pixel is adjusted to 124, 100, 89, 10, i.e., the value of cyan (C) is increased from 104 to 124. For all the remaining pixels/pixels forming non-gray portions, the CMYK color value is kept the same, i.e., the CMYK color values of the remaining pixels remain the same as received after the L*a*b to CMYK color space conversion. This way, an updated image is generated. The updated image includes adjusted color values, i.e., CMYK values for all the pixels forming the gray portion are adjusted according to the user input, and the same color values i.e., same CMYK color values for the remaining pixels forming the non-gray portion of the image.

Finally, at 608, the updated image is printed. The image is printed such that in the printed document, composite gray portions are adjusted based on the user input and the non-gray portions remain unchanged. This way, the method 600 manages the drifting of colors.

The present disclosure discloses methods and systems for handling/managing the drifting of colors in printing scenarios. The methods and systems focus on managing the drifting of colors specifically for gray portions in a document or an image in a document. The methods and systems include an option for user's selection to manage the drifting of colors for gray portions. For example, the methods and systems allow users to selectively adjust colors or balance colors of the gray portions of an image, thereby offer a modular solution to handle the drifting of colors. The methods and systems provide a very simple solution to manage the drifting of colors and further enhance the user experience.

The methods and systems address color drifting problems frequently seen in composite gray regions. The methods and systems operate on composite gray portions. The methods and systems provide an option to adjust only composite gray portions, without affecting or distorting color adjustment for non-gray areas.

The present disclosure provides a feature for composite gray adjustment on a user interface (UI). When the user enables the feature, any color adjustments that the user makes only impact gray portions of the image without affecting/impacting the remaining portions of the image/whole image.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, printing, adjusting, drifting, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for handling drifting of colors in an image while printing, the method comprising:
    receiving an input document comprising the image for printing, wherein the image comprises one or more gray portions and/or non-gray portions, and wherein the one or more gray portions are to be printed using composite gray colors;
    receiving an input from a user to adjust color of one or more gray portions of the image;
    identifying the one or more gray portions of the image;
    determining color values associated with the one or more identified gray portions of the image;
    based on the user input, selectively adjusting the determined color values associated with the one or more gray portions of the image, without affecting non-gray portions of the image, thereby generating an updated image; and
    printing the updated image comprising adjusted color values for the one or more gray portions of the image such that gray color in the printed image is consistent with gray color of the image in the input document.

2. The method of claim 1, wherein the color values determined for the one or more identified gray portions of the image are in CMYK (Cyan-Magenta-Yellow-Black/key) color space format.

3. The method of claim 2, wherein the input from the user comprises receiving change in color values corresponding to one or more primary colors of CMYK (Cyan-Magenta-Yellow-Black/key) color space format.

4. The method of claim 3, wherein the one or more primary colors comprise Cyan, Magenta, Yellow, and Black.

5. The method of claim 1, further comprising, identifying the one or more gray portions of the image using a pre-stored look-up table.

6. The method of claim 5, wherein the pre-stored look-up table comprises a list of probable color values for different gray color shades.

7. The method of claim 1, wherein adjusting the color values comprises adjusting the color values of one or more primary colors associated with the one or more gray portions of the image.

8. The method of claim 1, further comprising, providing an option to the user to adjust color of the one or more gray portions of the image via a user interface.

9. The method of claim 1, wherein the method is implemented at a multi-function device.

10. A multi-function device for handling drifting of colors situations in printing one or more images, the multi-function device comprising:
    a user interface for allowing a user to provide input to adjust color of one or more gray portions in an image submitted for printing;
    a controller comprising one or more modules for:
        receiving the image for printing, wherein the image comprises the one or more gray portions and non-gray portions, and wherein the one or more gray portions are to be printed using composite gray colors;
        identifying the one or more gray portions in the image;
        determining color values associated with the one or more gray portions of the image; and
        based on the user input, selectively adjusting the determined color values associated with the one or more gray portions of the image, without affecting non-gray portions of the image, thereby generating an updated image; and a print engine to print the updated image comprising adjusted color values for the one or more gray portions of the image such that gray color in the printed image is consistent with gray color of the image submitted for printing.

11. The multi-function device of claim 10, wherein the color values determined for the one or more identified gray portions of the image are in CMYK (Cyan-Magenta-Yellow-Black/key) color space format.

12. The multi-function device of claim 10, wherein the input from the user further comprises receiving change in color values corresponding to one or more primary colors of CMYK color space format.

13. The multi-function device of claim 10, further comprises a memory for storing a look-up table comprising a list of probable color values for different gray color shades.

14. The multi-function device of claim 13, wherein the identification of the one or more gray portions in the image is performed using the look-up table.

15. The multi-function device of claim 10, wherein adjusting the color values comprises adjusting the color values of one or more primary colors associated with the one or more gray portions of the image.

16. A printing device for handling drifting of colors in printing, the printing device is for:

receiving an image for printing, wherein the image comprises one or more gray portions and one or more non-gray portions, and wherein the one or more gray portions are to be printed using composite gray colors;

receiving an input from a user to adjust color of the one or more gray portions of the image;

identifying the one or more gray portions of the image;

determining color values associated with the one or more identified gray portions of the image;

based on the user input, selectively adjusting the determined color values associated with the one or more gray portions of the image, without affecting non-gray color portions of the image, thereby generating an updated image;

printing the updated image comprising adjusted color values for the one or more gray portions of the image such that gray color in the printed image is consistent with gray color of the image submitted for printing.

17. The printing device of claim 16, wherein the input from the user comprises receiving change in color values corresponding to one or more primary colors of CMYK color space format.

18. The printing device of claim 16, wherein the identification of the one or more gray portions of the image is performed using a pre-stored look-up table.

19. The printing device of claim 18, wherein the pre-stored look-up table comprises a list of probable color values for different gray color shades.

20. The printing device of claim 16, wherein adjusting the color values comprises adjusting the color values of one or more primary colors associated with the one or more gray portions of the image.

* * * * *